United States Patent [19]

Mosher

[11] Patent Number: 5,246,118
[45] Date of Patent: Sep. 21, 1993

[54] METHOD AND APPARATUS FOR SEPARATING AND SORTING ARTICLES

[75] Inventor: Oren A. Mosher, Castro Valley, Calif.

[73] Assignee: Package Machinery Company, Stafford Springs, Conn.

[21] Appl. No.: 915,435

[22] Filed: Jul. 17, 1992

[51] Int. Cl.⁵ .................................................. B07C 5/16
[52] U.S. Cl. ......................................... 209/592; 177/52
[58] Field of Search ............... 209/592, 593, 556, 596, 209/701, 706; 177/25, 50, 145, 187, 52-57

[56] References Cited

U.S. PATENT DOCUMENTS

| | | | |
|---|---|---|---|
| 4,096,950 | 6/1978 | Brook | 209/121 |
| 4,413,739 | 11/1983 | Kohashi | 209/593 |
| 4,610,361 | 9/1986 | Elliot | 209/593 |
| 4,818,380 | 4/1989 | Azegami | 209/565 |
| 5,020,675 | 6/1991 | Cowlin et al. | 209/592 |
| 5,114,015 | 5/1992 | Mussini | 209/593 |

Primary Examiner—Robert P. Olszewski
Assistant Examiner—Kenneth Noland
Attorney, Agent, or Firm—McCormick, Paulding & Huber

[57] ABSTRACT

Apparatus for separating and sorting articles that are supplied in bulk employs a series of vibratory feeders for generating a stream of the articles and gradually reducing the size of the stream for discharging the articles one by one into an accumulator. Individual articles are dispensed alternately from the accumulator to a pair of weigh scales which supply weight data to a controller for classifying each article in accordance with its weight. The individual articles are released from the weigh scales onto a conveyor where the articles are tracked and then sorted into a series of collectors according to their weight.

15 Claims, 2 Drawing Sheets

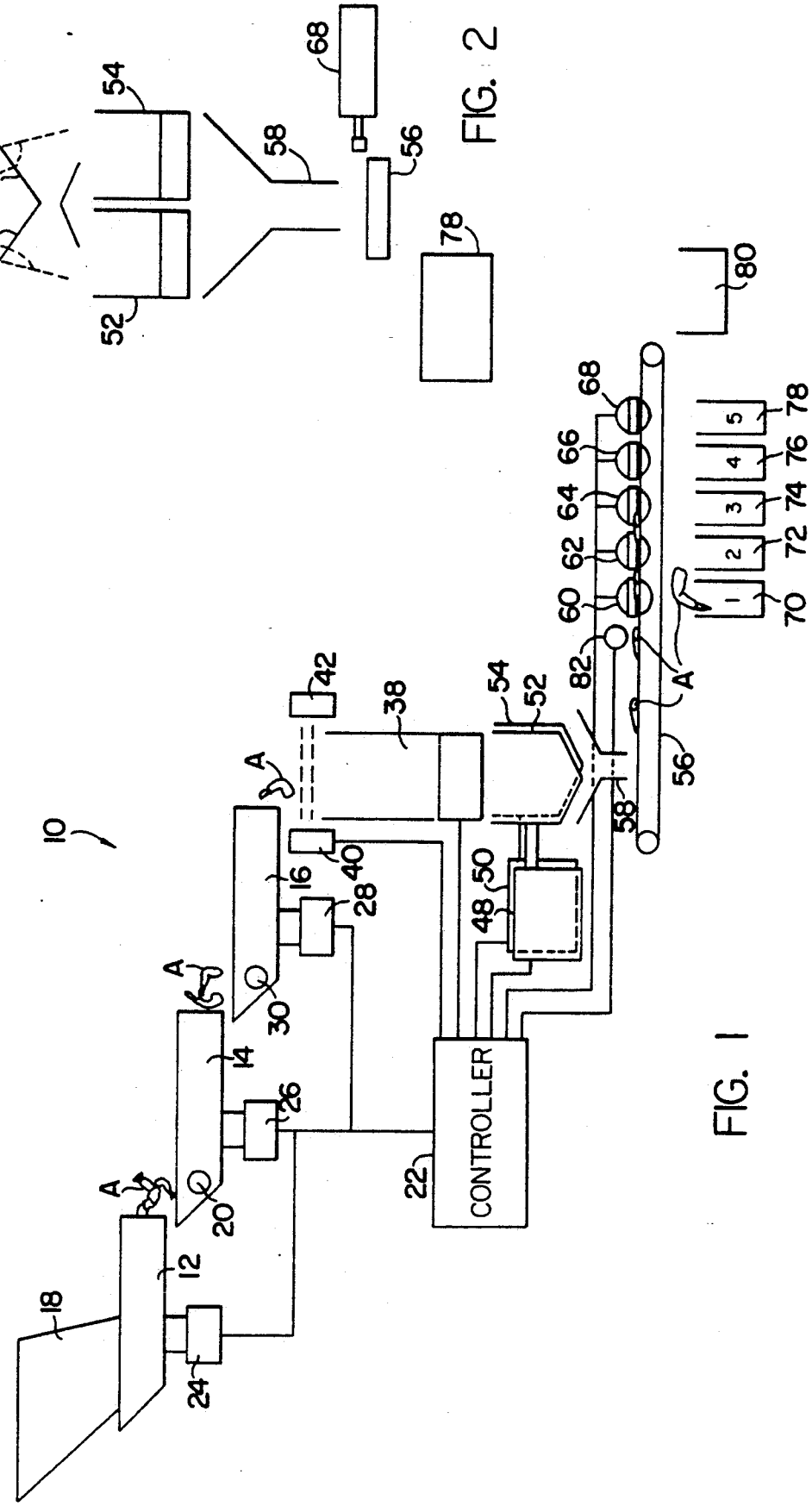

METHOD AND APPARATUS FOR SEPARATING AND SORTING ARTICLES

BACKGROUND OF THE INVENTION

The present invention relates to a method and apparatus for separating articles that are supplied in bulk and sorting the articles in accordance with their weight. The invention is especially useful for sorting food products such as shrimp, vegetables, fruits and the like which are typically supplied in large bulk containers of mixed sizes and weights and are then subdivided into smaller quantities for sale to the consumer.

Products such as shrimp, apples, potatoes and other food products when harvested do not have a uniform size and weight, but frequently are sold the consumer in packages in which the articles are generally uniform in size and weight. In other instances articles are sold with an intended homogeneous mixture of sizes. In both cases, the uniformity of size or the homogeneity of the mixture cannot be guaranteed by simply withdrawing the articles randomly from a bulk supply. Instead, the articles must be taken from the bulk supply and classified by size or weight, and then be reassembled in individual packages according to the size or mixture standards desired.

The necessity for classifying articles extends beyond the desires of the consumer, and in may cases is imposed by the physical constraints of the packaging processes or machines. For example, a pound of medium shrimp may contain as many as 27 shrimp or as few as 18 shrimp. If the packages in which the shrimp are sold are guaranteed to have a given piece count, and all of the shrimp delivered to a particular package are larger than normal, an average size package may not be large enough to enclose all of the shrimp or sealing of the package may at least be made difficult. Providing extra large packages to accommodate the occasional group of large shrimp is commercially unacceptable because the average package will then appear to be only partially filled.

Sometimes articles may be sold by both piece count and weight in which event the bulk quantities of shrimp must also be subdivided and classified according to weight prior to packaging. In this manner the consumer is assured of a relatively uniform size of product in the package, and the packages themselves may be sized to accommodate the intended piece count without appearing to be over- or underfilled.

The process of separating and sorting articles according to weight is not new and is described in several prior U.S. patents. U.S. Pat. No. 4,413,739 describes an automatic weight sorter which uses a belt conveyor and dynamic weighing device integrated with the conveyor for sorting articles that have already been placed individually on the conveyor. The patent does not reveal how the articles arrive at the conveyor, and the box-shaped representation of the articles suggests that the articles are packages that are manually loaded on the conveyor.

U.S. Pat. No. 4,818,380 discloses a sorting apparatus utilizing a conveyor and an image analysis system for classifying the articles by size. The apparatus is useful for sorting fruits and vegetables but again there is no indication of how the fruits and vegetables are loaded onto the conveyor so that each article can be examined individually for a size determination.

U.S. Pat. No. 4,096,590 discloses a sorting system that utilizes an overhead conveyor and an integrated weigh station for sorting individual poultry carcasses according to weight. The carcasses are loaded onto the overhead conveyor by a releasable clamp which suggests that the articles are separated from any bulk supply of the carcasses by hand.

While each of the prior art apparatuses discussed above sorts articles according to size or weight, none of them is suitable for separating the articles from bulk supplies to perform the disclosed sorting functions. Furthermore, dynamic scales integrated with a conveyor are not suitable for sorting and accurately classifying small, light weight articles such as shrimp.

It is accordingly a general object of the present invention to disclose a separating and sorting apparatus that is especially useful for articles that are supplied in bulk.

SUMMARY OF THE INVENTION

The present invention resides in a method and apparatus for separating and sorting articles that are customarily supplied in bulk quantities having a random mixture of articles by weight.

The apparatus, which operates in accordance with the method, includes feeding means that receives the articles in bulk quantities for separation. The feeding means withdraws the articles from a bulk supply and generates a moving stream of individual articles for movement toward a discharge station where the articles are discharged one by one.

Weigh scale means is provided for receiving the articles which are discharged one by one at the discharge station and produces a signal indicative of the article weight as each article is received. Typically, the articles pass from the feeding means into an accumulating receptacle, and the operation of the feeding means is halted until the accumulating means is ready to release the article into a waiting and empty weigh scale means. In this manner the discharging of the articles one by one from the feeding means is regulated at a rate that can be accommodated by the weigh scale means.

A plurality of collectors for receiving articles of different weight classes after weighing are provided adjacent a conveying means onto which the individual weighed articles move from the weigh scale means. The conveying means in one embodiment includes a plurality of ejectors that correspond respectively with the plurality of collectors, and each ejector pushes the articles of a given class into a corresponding collector in accordance with the weight of the article determined by the weigh scale means. In one embodiment, the ejectors are controlled by a timing means that measures the travel time of each article on the conveying means and actuates the appropriate ejector as the article reaches the corresponding collector.

The apparatus and the method by which it operates differ from the prior art discussed above in that the separating of the articles and sorting of the articles are performed essentially as an integral process in advance of the conveying device which delivers the articles to the appropriate collectors. In this regard the apparatus is particularly useful for separating articles supplied in bulk quantities and sorts those articles by weight.

The invention eliminates the use of piece count systems and additionally permits a packaging house to prepare packages that have either articles of uniform size and weight or a uniform mixture of articles of various sizes.

BRIEF DESCRIPTION OF THE DRAWINGS

FIG. 1 is a front elevation view schematically showing an article separating and sorting apparatus of the present invention.

FIG. 2 is a side elevation view schematically showing the sorting portion of the apparatus in FIG. 1.

DESCRIPTION OF THE PREFERRED EMBODIMENTS

Figure 3:
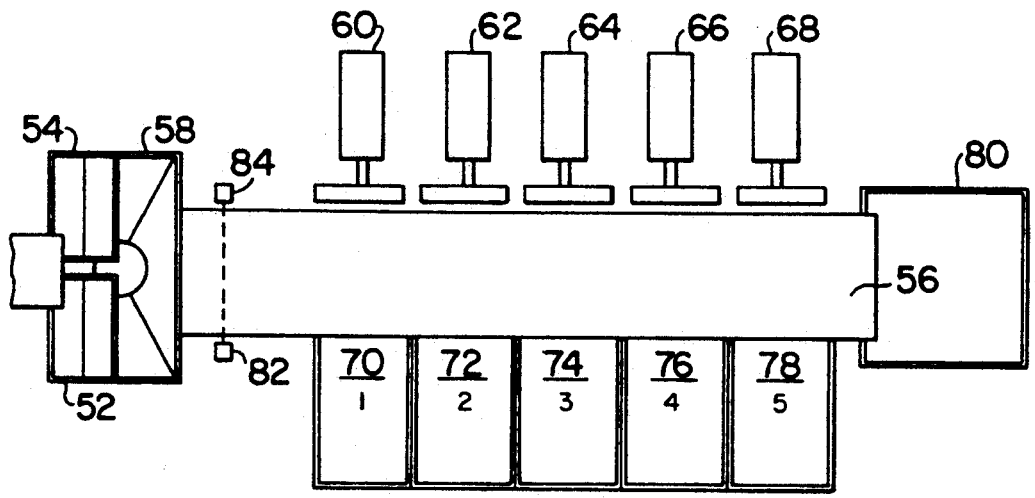
FIG. 3 is a plan view of the apparatus in FIG. 2.

FIG. 1 schematically shows an overall view of a separating and sorting apparatus, generally designated 10, for receiving articles A in bulk quantities and separating or classifying the articles into groups according to weight. The apparatus has particular utility for food items such as shrimp, vegetables, fruits and the like which are customarily delivered to a packaging house in large bulk containers. The articles in bulk vary individually in size and weight and are mixed randomly so that if packaged as supplied, the packages would not be uniform in any respect.

The apparatus 10 has a feed mechanism which includes a plurality of vibratory feeders 12,14,16 through which the articles A pass sequentially. The articles are initially received in bulk in the hopper 18 of vibratory feeder 12 and are drawn from the hopper and fed by the vibrator 12 into the tray of the vibrator 14 as a large stream of slow moving articles. The vibrator 14 accelerates the stream of articles toward the vibrator 16 at higher speed and correspondingly reduced size. The size of the stream of articles can also be reduced by a gradual narrowing of the channel in the vibrator tray as the articles move toward the discharge end of the tray. A level control "eye" 20 detects the level of articles in the tray and communicates with a microprocessor based controller 22 that in turn regulates the drive motors 24,26,28 of the respective vibrators. When the eye 20 detects an elevated level of articles in the tray of vibrator 14, the drive motor 24 of the vibrator 12 is turned off until the level in the vibrator 14 has dropped below the eye.

Similarly, the vibrator 16 further accelerates and reduces the size of the stream of articles. A gradual narrowing of the channel in the vibrator tray further reduces the size of the stream essentially to a single file of articles. A level control "eye" 30 is positioned in the tray of the vibrator and controls the drive motor 26 of the vibrator 14 through the controller 22. Accordingly, by means of the several stages of vibrators, the stream of articles A emanating from the bulk supply in the hopper 18 is sequentially reduced in size at each stage until the articles are discharged single file or one by one from the tray of the vibrator 16 and are completely separated. The number of stages of vibrators can be increased or decreased to as few as one depending upon the type of product being processed and the ease of separating the product from the bulk supply. The objective is to form a single file stream of articles at the discharge station of the feed mechanism.

The receptacle of an accumulator 38 is positioned at the discharge station of the feed mechanism immediately below the end of the vibrator 16 where the articles A are discharged one by one. An optical sensor 40 just above the accumulator 38 detects the passage of each article as it drops into the accumulator and signals the controller 22 which in turn momentarily de-energizes the vibrator motor 28 to stop any further feeding of articles from the vibrator 16. The sensor 40 can take a number of different forms apart from an optical sensor as long as it can detect each piece of product that is discharged from the vibrator 16. In the preferred embodiment of the invention, the sensor includes or cooperates with an infrared emitter element 42 at one side of the feed path into the accumulator 38 for emitting plural parallel beams of infrared light which lie in a horizontal plane and which are detected by the sensor 40 so that in effect the plane of light can be interrupted at any point by an article falling into the accumulator. One such sensor is made by Banner Engineering Corp. of Minneapolis, Minnesota.

Therefore, the articles A that are received at the hopper 18 are fed in a moving stream of product sequentially through the vibrators 12,14,16 and emerge from the last vibrator one by one to drop separately into the accumulator 38. The energization of the last vibrator 16 is interrupted so that only a single article is dropped and stored in the accumulator at any given time.

As shown most clearly in FIGS. 1 and 2, the accumulator 38 is positioned above two weigh scales 48,50 having weigh buckets 52,54 respectively. The buckets 52,54 are positioned in side-by-side relationship to alternately receive one article and then another from the accumulator 38. For this purpose the accumulator has two discharge doors 57,59 which are alternately opened to discharge an article into one weigh bucket or the other. For example, the door 57 is opened to discharge an article into weigh bucket 52, and the door 59 is opened to discharge product into bucket 54.

Once an article has been dropped or released from the accumulator 38 into one of the weigh buckets, the weigh scale 48 or 50 measures the weight of the article after a short settling period, and sends a signal representative of the measured weight to the controller 22 where the article then in the weigh bucket is classified by weight. For example, shrimp may range from 18 to the pound (25.2 grams each) to 27 to the pound (16.8 grams each). For packaging purposes this range of weight may be divided into five different categories or classes such as 18-19, 20-21, 22-23, 24-25, 26-27 shrimp to the pound. A shrimp weighing 25 grams would therefore be placed in class #1 (18-19 to the pound) while a shrimp weighing 17 grams would be placed in class #5 (26-27 to the pound).

Once an article A has been classified, the article is released from the weigh bucket 52 or 54 onto a conveyor belt 56 through a discharge chute 58 which lies directly below the weigh buckets as shown in FIG. 2. The conveyor belt 56 runs at a fixed speed. As the article advances along the belt, the article passes in front of a plurality of ejectors 60-68 connected with the controller 22. One of the ejectors selected by the controller in accordance with the classification of the article pushes the article off of the belt into a corresponding collector bin 70,72,74,76 or 78 into which all the other articles of the same class are ejected. If an article fails to fall within any class, the article travels to the end of the conveyor and drops into a re-work bin 80. For example, if two pieces of medium shrimp are frozen together and are not separated by the vibrators 12,14,16 of the feed mechanism and the articles pass through the weigh bucket together, their combined weight would most likely be in excess of the predetermined classifications. The two pieces would therefore end up in the bin 80. At that point the shrimp may be hand separated and returned to the hopper 18 for reprocessing.

As indicated in FIG. 2, one conveyor belt 56 is disposed beneath the two weigh buckets 52 and 54 and the discharge chute 58 for receiving and distributing articles A among the collector bins. The use of two weigh buckets in side-by-side relationship improves the processing rate of the products since the weighing operation is the most time consuming. Naturally the speed of processing is important with products that are sold in high volume and it is for these reasons that the accumulator 38 alternately feeds articles to one weigh scale or the other.

The apparatus 10 is controlled by a microprocessor within the controller 22 so that the entire operation runs at high speed in accordance with an internal clock. The processor after receiving a signal from the sensor 40 recognizes that the accumulator 38 is ready to deliver an article after a short fall delay that allows the article to reach the bottom of the accumulator. When a weigh bucket is ready, an article is dropped from the accumulator into the weigh bucket and after a brief settling time a weight reading is taken and the article is classified. In the meantime the other weigh bucket dumps an article and prepares to receive the next article from the accumulator 38. The process continues by alternating the weighing operations between one weigh scale and the other. In high speed operation, the discharging of the weighed article from a weigh scale and the releasing of a stored article from the accumulator partially overlap. Similarly the discharging of an article from the vibrator 16 by re-energizing the vibrator and discharging a stored article into the accumulator may also overlap.

The operation of the ejectors 60–68 is also controlled by the microprocessor based controller 22 which tracks the movement of an article from a weigh bucket onto the conveyor 56 and in front of the ejectors. When an article A from either one of the scales 52,54 is weighed, classified and released onto the conveyor belt 56, the article first passes a sensor 82 and starts a delay timer within the controller to actuate the appropriate ejector 60–68 when the article on the conveyor passes in front of the ejector corresponding to the weight class to which the article belongs. Naturally because a number of articles can be on the conveyor belt at the same time, the controller must have the capacity for timing the maximum number of articles that can appear on the conveyor belt. The sensor 82 can be an infrared optical sensor as represented in FIG. 3 with an infrared light source 84 disposed on the opposite side of the conveyor. Other types of sensors can also be employed.

Figure 4:
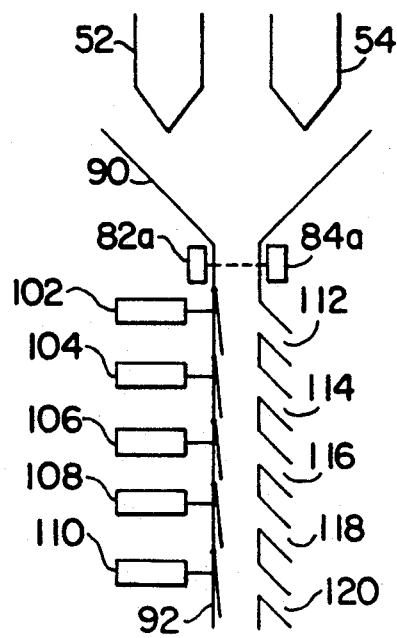
FIG. 4 is a schematic illustration showing an alternate embodiment of the sorting portion of the apparatus.

FIG. 4 illustrates an alternate embodiment of the sorting apparatus in which a discharge chute 90 and tube 92 replace the chute 58 and conveyor belt 56. As indicated at the top of FIG. 4, the two weigh buckets 52,54 are positioned above the discharge chute 90 so that product discharged alternately from one weigh bucket and the other drops downwardly and is guided into the tube 92. An optical sensor 82a and an infrared light source 84a are disposed at opposite sides of the tube 92 and detect each article as it passes and interrupts the infrared light beam across the tube. The signal derived from the sensor 82a starts a time clock in the controller 22 and causes one of a series of ejectors 102,104,106,108,110 to move a corresponding paddle or deflector across the tube 92 to direct the article through one of a series of distributor chutes 112,114,116,118,120 corresponding respectively with the ejectors. The ejector and distributor chute selected correspond to the weight class to which the article has been assigned following a weighing operation in the weigh bucket 52 or 54, and the distributor chutes accordingly guide the article along a conveying path to remote collector bins (not shown) for each weight class.

While the present invention has been described in several preferred embodiments, it should be understood that numerous modifications and substitutions can be made without departing from the spirit of the invention. For example, the feed mechanism which consists of the vibrators 12,14,16 can be replaced by equivalent feeding means such as one or more conveyor belts with rotating types to level the product as it drops from one belt to the other. The sensors employed for maintaining the article level in the vibrators have been disclosed as optical sensors but equivalent mechanical and other types of sensors can also be used. Similarly, the optical sensors employed for detecting the movement of individual articles into the accumulator 38, or along the conveyor belt 56 or into the discharge tube 92 may be mechanical, capacitive or other types of sensors. It should also be understood that a single weigh scale and bucket can be used for receiving the articles rather than a pair of weigh scales if higher production rates are not needed. With a single weigh scale, one door on the accumulator is sufficient. The single conveyor belt 56 for two weigh scales can also be replaced by a pair of conveyor belts, and the collection bins can be located at one or both sides of the single belt for receiving the classified articles. Accordingly the present invention has been described in a number of preferred embodiments by way of illustration rather than limitation.

I claim:

1. Article separating and sorting apparatus for articles of various weights comprising:
   feeding means receiving articles in bulk quantities for separating the bulk quantities into a moving stream of individual articles for movement and discharge one by one at a discharge station;
   weigh scale means receiving, weighing and discharging one by one the articles discharged at the discharge station by the feeding means, the weigh scale means producing a signal indicative of the weight of each article received and discharged;
   a plurality of receivers for receiving articles of different weight classes, and
   conveying means receiving the individual weighed articles from the weigh scale means and distributing the articles by weight to the receivers in accordance with the weight signals from the scale means.

2. Article separating and sorting apparatus as defined in claim 1 wherein:
   the feeding means is energized and de-energized to start and stop respectively the moving stream of products;
   sensing means associated with the feeding means at the discharge station detects the articles discharged individually from the feeding means; and
   control means are operatively connected with the feeding means for de-energized the feeding means in response to the detection of a discharged article whereby the feeding of articles is stopped at least momentarily with each article discharged.

3. Article separating and sorting apparatus as defined in claim 2 further including:

a receptacle at the discharge station for receiving and releasing each of the discharged articles to be weighed sequentially; and wherein the control means is operatively connected with the receptacle to re-energize the feeding means when a discharged article is released from the receptacle to insure feeding of the articles for weighing one at a time.

4. Article separating and sorting apparatus as defined in claim 3 wherein:

the receptacle at the discharge station has at least one discharge door for releasing a received article from the receptacle; and the weighing scale means is disposed to receive the article released from the receptacle and deliver a weighed article to the conveying means; and the control means is responsive to the weigh scale means to cause the receptacle to release an article to the weigh scale means after a preceding article is weighed and delivered to the conveying means.

5. Article separating and sorting apparatus as defined in claim 2 wherein the feeding means includes a series of vibrators between which the moving stream of articles extends with the articles passing sequentially from one vibrator to the next, each vibrator being de-energized and energized to respectively stop and start the moving stream of articles.

6. Article separating and sorting apparatus as defined in claim 1 wherein:

an accumulating receptacle is positioned at the discharge station of the feeding means and includes a plurality of release doors for releasing articles individually and sequentially through the doors to the weigh scale means; and the weigh scale means includes a plurality of weigh scales associated respectively with the plurality of doors in the accumulating receptacle for receiving and weighing the individual articles released sequentially.

7. Article separating and sorting apparatus as defined in claim 6 wherein the accumulating receptacle has a pair of mating doors at the bottom of the receptacle, the doors being individually and alternately operated to release articles individually and alternately to one and an opposite side of the receptacle; and the weigh scale means includes two weigh scales disposed at one and the opposite sides of the receptacle to alternately receive the released articles.

8. Article separating and sorting apparatus as defined in claim 1 wherein:

the conveying means includes a conveying path which the articles move from the weigh scale means to a plurality of collectors, and ejector means is positioned along the path for ejecting the articles by weight into appropriate collectors.

9. Article separating and sorting apparatus as defined in claim 8 wherein:

the collectors are located at different stations along the conveying path;

the ejector means includes a plurality of ejectors at the different stations and corresponding respectively with the collectors for ejecting the articles from the convey path into the collectors; and control means are connected with the weigh scale means and the ejectors to operate the ejectors and distribute the articles into the appropriate collectors by weight.

10. Article separating and sorting apparatus as defined in claim 9 wherein:

the control means includes an article sensor along the conveying path in advance of the plurality of ejectors and timing means for tracking the movement of the articles from the sensor to the respective ejectors to actuate the appropriate ejector and divert the articles into the corresponding collector as an article reaches the ejector.

11. Article separating and sorting apparatus as defined in claim 8 wherein the conveying means further includes a conveyor belt, and the ejector means has a plurality of ejectors located at different stations along the conveyor belt, and the collectors are also located along the conveyor belt at the different stations to receive the articles ejected by the respective ejectors.

12. Apparatus for separating and sorting articles by weight comprising:

feeding means for generating a moving stream of individual articles for movement toward a discharge station;

an accumulator located at the discharge station of the feeding means for receiving and storing articles discharged from the feeding means;

control means including a sensor associated with the feeding means at the discharge station for detecting the discharge of individual articles from the moving stream, the control means also be operatively connected with the feed means to interrupt a feeding operation with the detection of each article discharged into the accumulator whereby the articles are caused to be discharged into the accumulator one at a time;

the control means also being connected with the accumulator means for controlling the release of an article stored by the accumulator;

a weigh scale positioned to receive articles released by the accumulator and generating a weight signal indicative of the measured weight of each article received, the weigh scale including means for discharging a weighed article after weighing; and conveying means positioned to receive articles discharged from the weigh scale and associated with the weigh scale for receiving the weight signal and distributing the individual articles according to the measured weights.

13. Apparatus for separating and sorting as defined in claim 12 wherein the feeding means includes a plurality of vibratory feeders arranged to serially reduce the size of the moving stream of articles in advance of the discharge station.

14. Apparatus for separating and sorting as defined in claim 12 wherein the accumulator has a pair of doors, each door being operable independently of the other;

the weigh scale is one of two weigh scales, each being positioned to receive articles released from a different one of the doors of the accumulator; and the control means is connected with the accumulator to cause the articles to be released alternately to one weigh scale and then the other through the independently operated doors.

15. Apparatus for separating and sorting as defined in claim 14 wherein the conveying means receives individual articles from each of the weigh scales for distribution according to the measured weights.

* * * * *